United States Patent [19]

Diener et al.

[11] Patent Number: 4,548,130
[45] Date of Patent: Oct. 22, 1985

[54] AUTOMATIC FOOD COOKING MACHINE

[76] Inventors: Lester Diener, Box 354; Ernest J. Miller, R.R. 2 Box 2105, both of Spooner, Wis. 54801

[21] Appl. No.: 584,748

[22] Filed: Feb. 29, 1984

[51] Int. Cl.[4] ............................................. A47J 37/04
[52] U.S. Cl. ...................................... 99/345; 99/402; 99/427; 99/443 C; 99/448; 222/166
[58] Field of Search ................ 99/402, 345, 346, 427, 99/443 R, 448, 443 C; 126/41 C, 25 A; 222/164, 166; 141/129, 284; 426/523

[56] References Cited

U.S. PATENT DOCUMENTS

| | | | |
|---|---|---|---|
| 2,182,225 | 12/1939 | Garvis | 99/346 |
| 3,025,782 | 3/1962 | Stall | 99/402 X |
| 3,025,783 | 3/1962 | Coudek | 99/345 |
| 3,295,434 | 1/1967 | Wilhelm | 99/346 |
| 3,499,380 | 3/1970 | Gongwer | 99/402 X |
| 3,563,160 | 2/1971 | Otsuka | 99/345 |
| 3,943,837 | 3/1976 | Trkla | 126/25 A |
| 4,262,586 | 4/1981 | Miller | 99/345 |

Primary Examiner—Billy J. Wilhite
Attorney, Agent, or Firm—Peterson, Wicks, Nemer & Kamrath

[57] ABSTRACT

The present invention is an automatic food cooking machine comprising a frame supporting a housing having an unobstructed opening with an adjustable heating surface at the bottom thereof. Mounted in the opening of the housing are a pair of spaced parallel endless conveyor chains supported on sprockets connected to a pair of spaced shafts—one driven by a motor, and one used for adjustment of conveyor chain tension. Mounted between these shafts are idler sprockets used to support the conveyor chain.

A plurality of spaced angles are connected to the conveyor chains, and a retainer fastened to the spaced angle is used to secure each food basket comprised of a bottom, four sides, and a hinged lid. A sauce dispenser is supported by a bracket fastened to a slide rail at the top of the housing. As the actuating tab fastened to a retainer moves slowly toward the sauce dispenser and makes contact, it automatically rotates said dispenser 90° allowing sauce to drip directly on the food product. As the actuating tab travels past the sauce dispenser, said dispenser automatically returns to an upright or "off" position.

A heating surface located at the bottom of the housing is supported by four cables passing through guides to a central guide where they are swedged to a main cable that is fastened to a hand crank.

20 Claims, 6 Drawing Figures

AUTOMATIC FOOD COOKING MACHINE

CROSS REFERENCE

Disclosure Document No. 118401 dated June 24, 1983 was filed in regard to the present invention.

Field of Invention

This invention is a Food Cooking Machine and more specifically an improved machine for automatic food cooking.

Discussion of Prior Art

Heretofore, difficulties have arisen in food preparation requiring a manual rotation of food products over a source of heat such as shown in Stall U.S. Pat. No. 3,025,782. Also note the difficulty of maintaining a constant cooking temperature due to a stationary heating surface in the prior art.

Heretofore, the food basket was supported by a rod that had to be aligned to a pair of lugs on the conveyor chain. With heat and smoke coming from the machine, difficulty is experienced in loading and unloading the food product as shown in Gongwer U.S. Pat. No. 3,499,380.

Heretofore, the food products were dipped into a sauce tank located near the base of the housing. Disadvantages of this process are as follows:
 (a) A dilution of the sauce occurs as a result of fat being cooked out of the food product and being dipped resulting in a "washing effect".
 (b) The excessive amount of sauce required for the dipping operation.
 (c) The large volume of diluted, hot, sauce leftover, and the removal and disposal of the hot sauce.
Refer to Gongwer U.S. Pat. No. 3,499,380.

Objects

Accordingly, it is an object of this invention to provide a better cooking machine with a conveyor for transporting food products to be cooked over an adjustable heating surface, therefore, requiring less energy to maintain an even cooking temperature. An additional object of this cooking machine is the ease of loading and unloading the food basket. This is made possible by sliding a food basket into a retainer which secures the basket on all sides, eliminating the need for a fastening device on the food basket, and also allowing the loading and unloading of the food basket while the machine is in motion.

Another object of this cooking machine is the application of a sauce to the food product.
 (a) The dispenser provides a method of applying a fresh supply of sauce to the food product.
 (b) The dispenser provides a controlled method of applying the exact amount of fresh sauce required to complete a cooking cycle.
 (c) The dispenser is mounted to the top wall on a sliding rail providing easy filling and cleaning of the dispenser.

An additional object of this invention is a vertical drop and climb of the food basket allowing fat to drain off the food product and also lending additional food product capacity to the cooking machine.

Further objects and advantages of our invention will become apparent from a consideration of the drawings and ensuing description thereof.

Description of Drawings

For a better understanding of the present invention reference may be had to the accompanying drawings wherein the same reference numerals have been applied to like parts and wherein.

DESCRIPTION OF INVENTION

Figure 1:
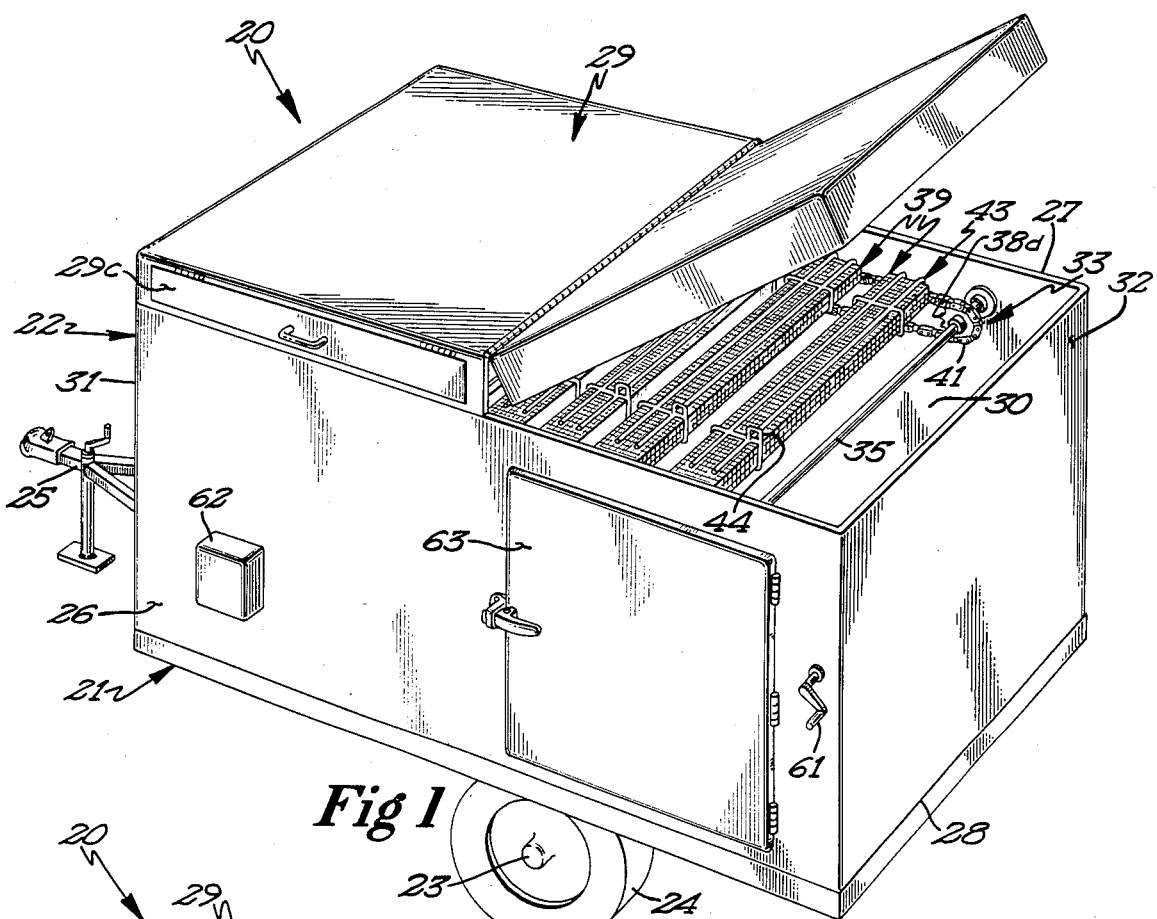
FIG. 1 is a perspective view of an automatic cooking machine built in accord with the present invention.
Figure 2:
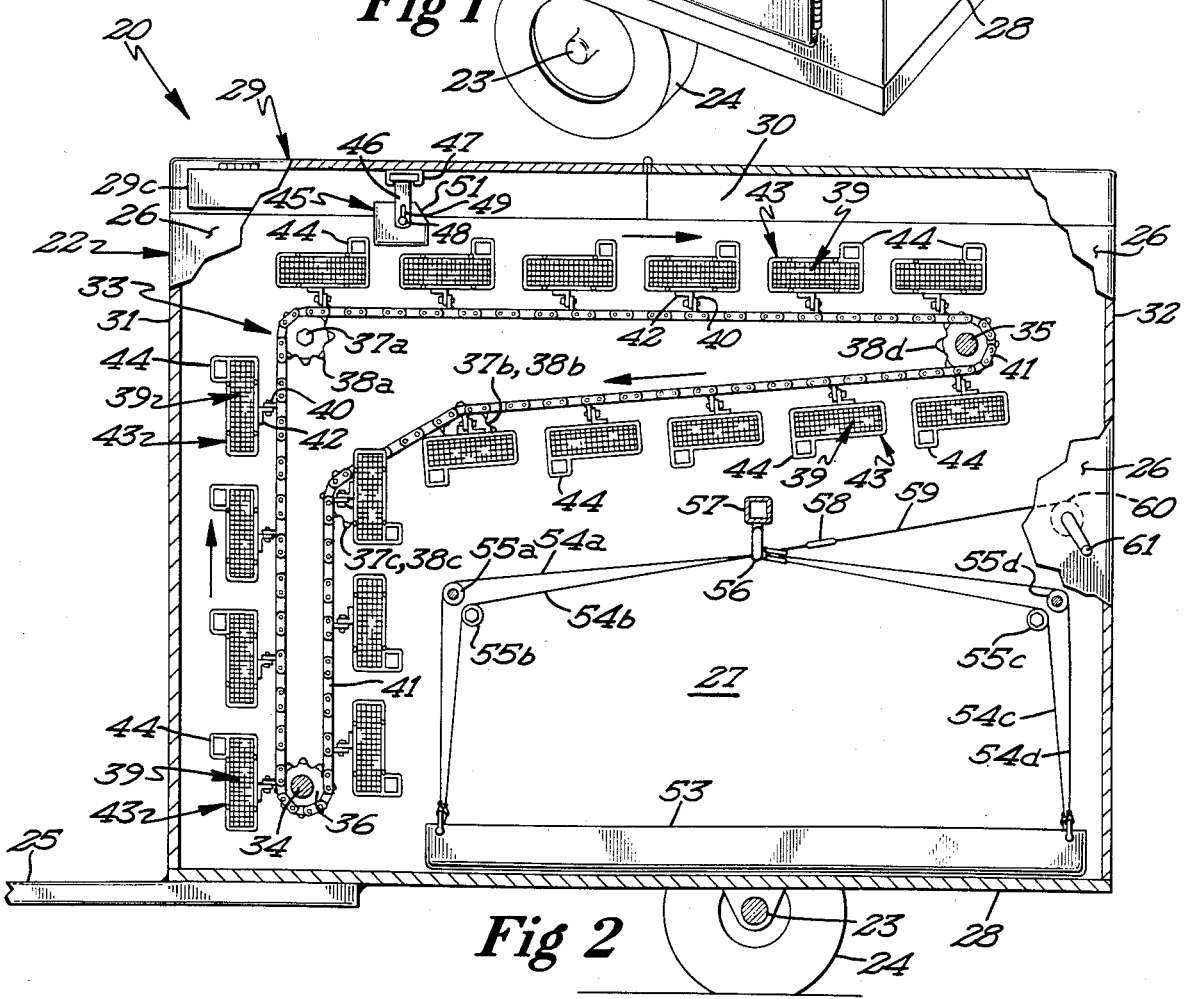
FIG. 2 is a cross sectional view of the automatic cooking machine of FIG. 1.
Figure 5:
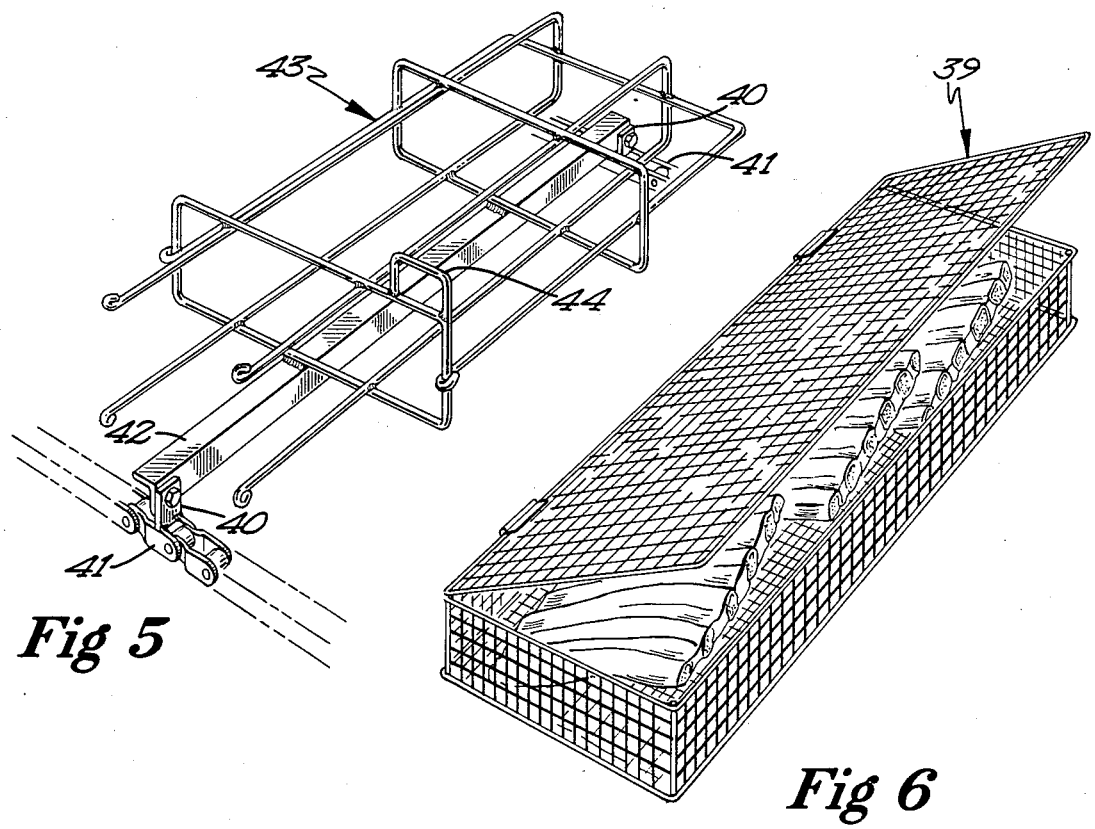
FIG. 5 shows a perspective view of a retainer with an adjustable actuating tab of the automatic cooking machine of FIG. 1.

The invention described as follows is an automatic food cooking machine best shown as 20 in FIG. 1. Said machine comprising a frame 21 supporting a housing. The frame 21 is supported on an axle 23 having a pair of wheels 24. A hitch with an adjustable jacket 25 is provided at one end of the frame 21. The housing 22 is defined by a pair of vertical walls 26,27, a bottom wall 28 secured to the frame 21, and a top wall 29 connected to the side walls 26, 27 providing an unobstructed opening 30 from one end of the front 31 to the other end of the rear 32 of the housing 22. The housing 22 and all the parts thereof are of metal. Mounted in the opening 30 is a conveyor means 33 and a heating surface as shown in FIG. 2. The conveyor means 33 comprises a pair of spaced parallel shafts 34, 35 mounted in bearings disposed in side walls 26 and 27, with one of the shafts 34 being located in the lower front of the opening 30 and the other one of the shafts 35 being located in the top rear of the opening 30. Shaft 34 is connected to a power means 62 such as a gear reduction motor best shown in FIG. 1. A pair of sprockets 36 are secured to opposite ends of the shaft 34. Idler sprockets 38d are on shaft 35 as best shown in FIG. 2. Idler studs 37a, 37b, 37c along with idler sprockets 38a, 38b, 38c are fastened to the side walls 26, 27 as best shown in FIG. 2. A plurality of risers 40 are secured to the chain 41 at spaced intervals and are arranged in pairs. Secured to the riser 40 is a plurality of angles 42, and a retainer 43 is mounted on each angle as shown in FIG. 5. The retainer 43 is formed of metal rods and on each retainer, an adjustable actuating tab 44 is fastened as best shown in FIG. 5.

Figure 3:
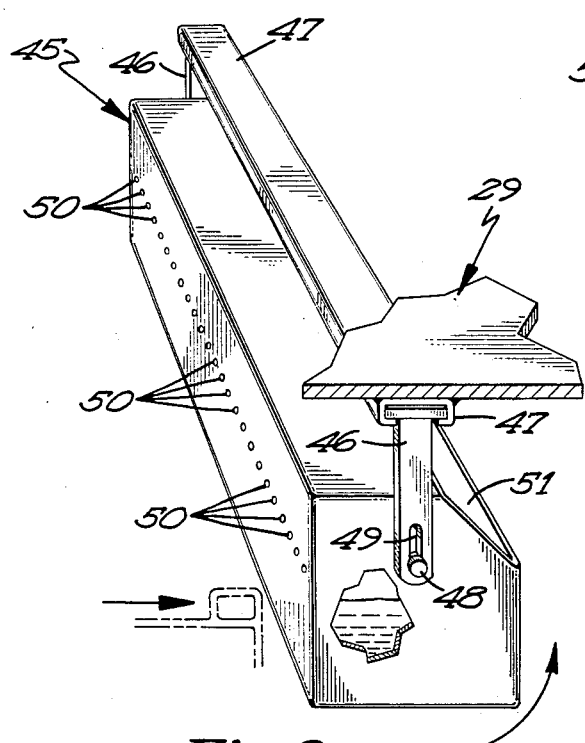
FIG. 3 is a perspective view of the automatic drip dispenser (with bracket) of the automatic cooking machine of FIG. 1 in the "off" position.
Figure 4:
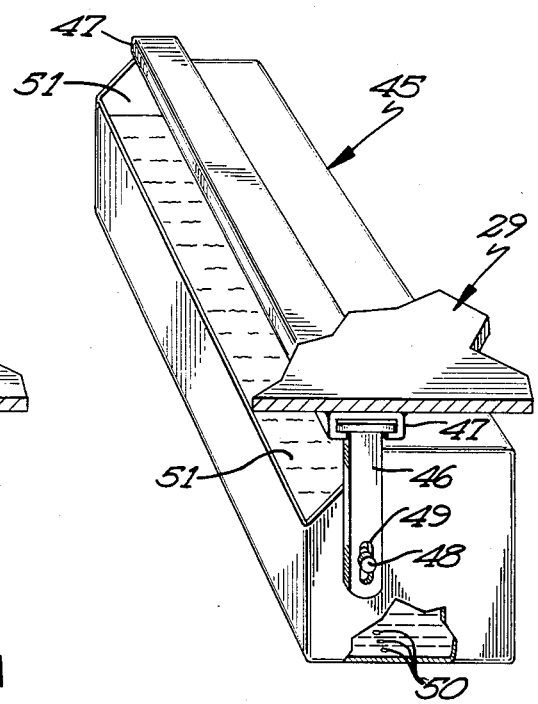
FIG. 4 shows a perspective view of the automatic drip dispenser (with bracket) of the automatic cooking machine of FIG. 1 in an "on" position.
Figure 6:
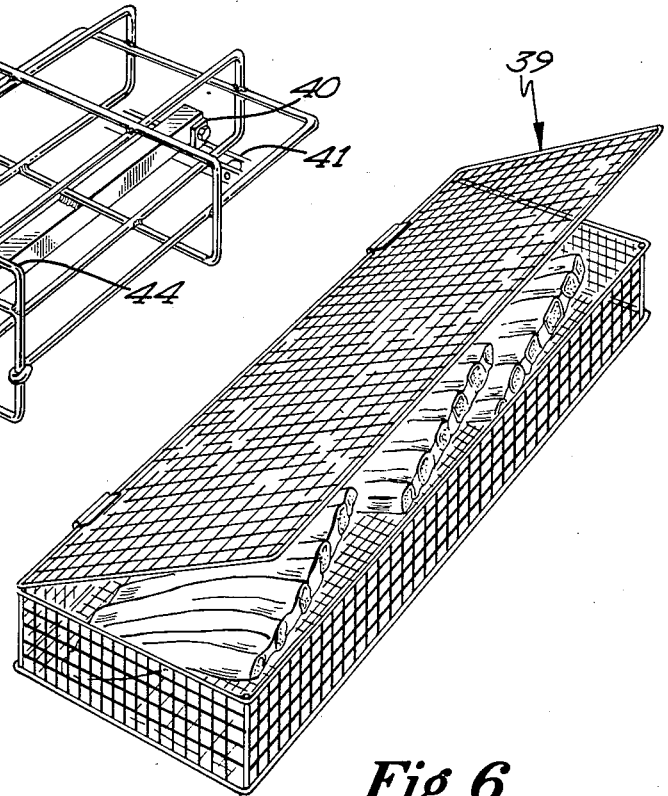
FIG. 6 is a perspective view of a food basket of the automatic cooking machine of FIG. 1.

The food basket 39 is constructed of stainless steel mesh or suitable material and comprises a bottom, four sides, and a hinged lid as best shown in FIG. 6. The sauce dispenser 45 comprises a bottom, four sides with a plurality of small openings 50 on one of the four sides, and a top with a fill opening 51. A mounting bracket 46 is provided with elongated holes 49 attached to pivot points 48 on the dispenser 45. A slide-out rail 47 is disposed on the top wall 29. Sauce dispenser with bracket and slide out rail are best shown in FIGS. 2 and 3. The heating system includes a pan 53; four secondary cables 54a, 54b, 54c, 54d; four guides 55a, 55b, 55c, 55d, fastened to the side walls 26, 27; a center guide 56 mounted to a center support 57 fastened to side walls 26, 27; a swedge 58, a main cable 59, a reel 60 and a hand crank 61. The heating system is best shown in FIG. 2. The heating surface door 63 is located on side wall 26, and the service door 29c is located in the top front of sidewall 26 as best shown in FIG. 1.

Operation of Invention

The present invention is an automatic food cooking machine comprising a frame supporting a housing having an unobstructed opening therein. The frame is supported on an axle having a pair of wheels for movement of the machine from one location to another. A trailer hitch at one end of the frame is provided for securing the machine to a vehicle. The housing is defined by a pair of vertical side walls and a bottom wall secured to the frame and a top wall connected to the side walls providing an unobstructed opening from one end of the front to the other end of the rear of the housing. The housing and all the parts therein are of metal. The bottom and sidewalls are of such construction as to withstand the cooking temperatures. Mounted in the opening is a conveyor means for transporting the food product to be cooked over a heating surface. The conveyor means comprises a pair of spaced parallel shafts mounted in bearings disposed in the side walls, with one of the shafts being located in the lower front of the housing and the other of the shafts being located in the rear of the housing. The lower front shaft is connected to a power means such as a gear reduction motor for rotating the shaft at a predetermined speed. A pair of sprockets are secured to opposite ends of the shaft to drive the conveyor means. The upper rear shaft and idler sprockets thereon are solely for supporting and maintaining the proper tension on the conveyor means. Idler sprockets mounted on idler studs are solely for the purpose of supporting the conveyor means. A plurality of risers are secured to the conveyor chain at spaced intervals and are arranged in pairs. Secured to the risers is a plurality of angles, with a retainer mounted on each. More specifically the retainer is constructed of metal rods and so formed to give support to each side of the food basket. The retainer is open on one end for easy removal of the food basket and on each retainer, an adjustable actuating tab is mounted for rotating the sauce dispenser. The food basket is constructed of stainless steel mesh or suitable material for exposure of the food product to the heating surface. The basket comprises a bottom, four sides, and a hinged lid. The sauce dispenser is supported at each end by a bracket which slides into a rail mounted on the top wall. Said rail allows the sauce dispenser and bracket to slide out of door opening for ease in filling said dispenser. The pivot point of the dispenser is so positioned that the dispenser will remain in an upright or "off" position until it is engaged by the actuating tab on the retainer. The pivot point is mounted in an elongated hole to allow for variance in the actuating tabs. A plurality of small openings are located on the sauce dispenser and are positioned in such a way as to be above the level of the sauce when said dispenser is in an upright or "off" position. Upon contact of actuator tab, the sauce dispenser is rotated 90° moving the plurality of small openings to an "on" position dispensing sauce directly on the food product. The heating surface is suspended above the bottom wall by four cables passing through four guide means on the side walls and then passing through a center guide which is mounted on a center support. Said cables are fastened by a swedge to a main cable attached to a reel which in turn is fastened to a crank for an infinite number of heat adjustments. The heating surface door provides easy access to the heating surface and the service door provides access for servicing the drip dispenser and the loading and unloading of food baskets from the machine.

The cooking operation can best be understood by following a food basket inside a retainer through a complete cooking cycle. Starting at the service door, the food basket located inside of the retainer moves slowly towards the sauce dispenser. As an adjustable actuating tab makes contact with the sauce dispenser, it automatically rotates said dispenser 90° allowing the sauce to drip directly on the food product through the small openings on the side of the dispenser. As the adjustable actuating tab travels past the sauce dispenser, said dispenser returns to an upright or "off" position. As the food basket in the retainer travels to the rear of the unobstructed opening, it exposes one side of the food product to the heating surface. Upon reaching the idler sprocket near the rear wall, said basket and said retainer are rotated 180° exposing the other side of the food product to the heating surface. It then proceeds to the front of the unobstructed opening passing over idler sprockets and into a vertical drop to the drive sprocket where said food basket and said retainer rotate 180° and proceed in a vertical climb to the idler sprocket located near the service door. This vertical drop and climb allows for excessive fat drain off and lends additional food product capacity to the cooking machine.

While the above description contains many specificities, these should not be construed as limitations on the scope of the invention, but rather as an exemplification of one preferred embodiment thereof. Many other variations are possible. For example, this cooking machine is unique in that varying sizes can easily be built without any alteration of design. Inventors' at present have built four prototypes, the smallest being a household unit measuring 32" long, 26" high and 20" wide. Accordingly, the scope, of the invention should be determined not by the embodiment illustrated, but by the appended claims and their legal equivalents.

The invention claimed is:

1. Food cooking machine comprising, in combination: means for heating the food; a multiplicity of food baskets, with each food basket having a bottom, a first side, a second side, a third side, a fourth side, and a top defining a food receiving interior, with the food baskets formed of material allowing exposure to the heating means of the food located within the food receiving interior of the food baskets; means for transporting the food baskets to expose the food located in the food receiving interior of the food baskets to the heating means; with the transporting means comprising, in combination: retainers for removably receiving the food baskets, with each of the retainers including a top, a bottom, a first side, and a second side defining a retainer interior for removably receiving the food baskets, with each of the retainers further including a generally open end for the slidable receipt of the food baskets into the retainer interior, with the top, bottom, and sides of the retainer being generally closed for removal of the food baskets therethrough but which allow the food in the food receiving interior of the food baskets to be exposed to the heating means; and means for conveying the retainers and the food baskets located therein along a cooking cycle path.

2. The food cooking machine of claim 1 wherein the bottom, sides, and top of the food baskets are generally closed for preventing the food from passing therethrough; and wherein the food baskets further include means for providing access to the food receiving interior of the food baskets.

3. The food cooking machine of claim 2 wherein the food access providing means comprises, in combination: means for hinging at least the top of the food basket to one of the sides of the food basket from an open position to a closed position and wherein the interior of the retainers have a size complementary to the size of the food baskets to prevent the top of the food basket from hinging from its closed position when the food basket is received within the retainer.

4. The food cooking machine of claim 1 wherein the retainer is formed of metal rods.

5. The food cooking machine of claim 1 further comprising, in combination: means for dispensing sauce to the food located in the food receiving interior of the food baskets as the food baskets are being transported along the cooking cycle path by the transporting means with the sauce dispensing means comprising, in combination: a sauce dispenser; means for pivotally mounting the sauce dispenser about a pivot axis located above the cooking cycle path; and means for pivoting the sauce dispenser between an on position wherein the sauce of the sauce dispenser is dispensed to food located within the food receiving interior of the food baskets and an off position wherein the sauce is retained in the sauce dispenser; with the sauce dispenser having a closed bottom, a closed first side, a closed second side, a closed third side, a closed fourth side, and a top including a filling open; with the pivot axis of the sauce dispenser extending through the third and fourth sides of the sauce dispenser, with the pivot axis of the sauce dispenser being positioned so that the sauce dispenser will remain in its off position until it is pivoted by the pivoting means, with the first side of the sauce dispenser including a plurality of small, sauce dispensing openings positioned above the sauce in the sauce dispenser when the sauce dispenser is in its off position; wherein in the on position the first side of the sauce dispenser is located generally horizontally over the food baskets such that the sauce flows through the openings of the first side of the food dispenser and onto the food located in the food baskets and retainers and in the off position the first side of the sauce dispenser is located generally vertically such that the sauce cannot flow through the openings of the first side of the food dispenser but is retained within the sauce dispenser.

6. The food cooking machine of claim 4 wherein the sauce dispenser pivoting means comprises means for pivoting the sauce dispenser from the off position to the on position when the transporting means moves the food retainers and the food baskets vertically below the sauce dispenser and for allowing the sauce dispenser to return to its off position when the transporting means move the food retainers and the foods baskets away from vertically below the sauce dispenser; wherein the sauce dispenser pivoting means comprises, in combination: actuating tabs connected to the transporting means for engaging with and pivoting the sauce dispenser from its off position to its on position.

7. The food cooking machine of claim 5 wherein the pivotally mounting means comprises, in combination: a bracket having first and second ends; first and second pivot points formed on the sauce dispenser and defining the pivot axis of the sauce dispenser, with the pivot points being received in apertures formed in the ends of the bracket; and means for removably, slidably mounting the bracket perpendicular to the cooking cycle path of the transporting means comprising a slide-out rail for slidably receiving the bracket allowing ease in filling and cleaning the sauce dispenser.

8. The food cooking machine of claim 1 wherein the cooking cycle path of the conveying means is generally in a first, horizontal direction over the heating means, in a second, horizontal direction 180° from the first, horizontal direction over the heating means, in a third, vertically downward direction beyond the heating means and 90° from the second direction, in a fourth, vertically upward direction 180° from the third direction, and back to the first direction for exposing both sides of the food located within the food receiving interior of the food baskets to the heating means when the retainers and food baskets are in horizontal directions of the cooking cycle path, for allowing fat to drain off the food located within the food receiving interior of the food baskets when the retainers and food baskets are in vertical directions of the cooking cycle path, and for increasing the number of food baskets and retainers of the transporting means.

9. The food cooking machine of claim 8 wherein the cooking cycle path of the conveying means from the second direction to the third direction is generally in a fifth direction 45° from the second direction and in a sixth direction 45° from the third direction for further increasing the number of food baskets and retainers of the transporting means.

10. The food cooking machine of claim 1 further comprising, in combination: means for adjustably locating the heating means below the cooking cycle path of the transporting means, with the heating means including a perimeter; with the adjustably locating means comprising, in combination: at least three secondary cables having first ends and second ends, with the first ends of the secondary cables secured at spaced locations around the perimeter of the heating means; a main cable having a first end and a second end; means for winding the first end of the main cable on a reel; with the second ends of the secondary cables secured to the second end of the main cable; means for guiding each of the secondary cables from a vertical position to a horizontal position; and means for guiding the secondary cables adjacent to their second ends and substantially centrally of the heating means.

11. Food cooking machine comprising, in combination: means for heating the food; means for dispensing sauce to the food; means for transporting the food to expose the food to the heating means and to expose the food to the sauce dispensing means; with the sauce dispensing means comprising, in combination: a sauce dispenser; means for pivotally mounting the sauce dispenser about a pivot axis for movement between an on position wherein the sauce of the sauce dispenser is dispensed to the food and an off position wherein the sauce is retained within the sauce dispenser; actuating tabs formed on the transporting means for engaging with the sauce dispenser and for pivoting the sauce dispenser from its off position to its on position, with the pivot axis of the sauce dispenser being positioned so that the sauce dispenser remains in its off position unless the sauce dispenser is engaged by the actuating tabs of the transporting means.

12. The food cooking machine of claim 11 wherein the sauce dispenser comprises, in combination: a closed bottom, a closed first side, a closed second side, a closed third side, a closed fourth side, and a top including a filling open; with the pivot axis of the sauce dispenser extending through the third and fourth sides of the sauce dispenser; with the first side of the sauce dispenser including a plurality of small, sauce dispensing openings positioned above the sauce in the sauce dispenser when the sauce dispenser is in its off position; wherein in the on position the first side of the sauce dispenser is located generally horizontally over the food being transported by the transporting means such that the sauce flows through the openings of the first side of the food dispenser and onto the food being transported by the transporting means and in the off position the first side of the sauce dispenser is located generally vertically such that the sauce cannot flow through the openings of the first side of the food dispenser but is retained within the sauce dispenser; and wherein the pivotally mounting means comprises, in combination: a bracket having first and second ends; first and second pivot points formed on the sauce dispenser which define the pivot axis of the sauce dispenser, with the pivot points being received in apertures formed in the ends of the bracket; and means for removably, slidably mounting the bracket comprising a slide-out rail for slidably receiving the bracket allowing ease in filling and cleaning the sauce dispenser.

13. The food cooking machine of claim 11 wherein the transporting means transports the food along a cooking cycle path, wherein the cooking cycle path is generally in a first, horizontal direction over the heating means, in a second, horizontal direction 180° from the first, horizontal direction over the heating means, in a third direction 45° from the second direction, in a fourth direction 135° from the third direction, in a fifth, vertically downward direction beyond the heating means and 90° from the second direction, in a sixth, vertically upward direction 180° from the fifth direction, and back to the first direction for exposing both sides of the food to the heating means in horizontal directions of the cooking cycle path, for allowing fat to drain off the food in vertical directions of the cooking cycle path, and for increasing the capacity of the transporting means.

14. The food cooking machine of claim 13 wherein the sauce dispensing means comprises, in combination: means for dispensing sauce to the food in the first direction of the cooking cycle path and before the food is over the heating means.

15. The food cooking machine of claim 11 further comprising, in combination: a multiplicity of food baskets, with each food basket having a bottom, a first side, a second side, a third side, a fourth side, and a top defining a food receiving interior, with the food baskets formed of material allowing exposure to the heating means of the food located within the food receiving interior of the food baskets; with the transporting means comprising, in combination: retainers for removably receiving the food baskets, with each of the retainers including a top, a bottom, a first side, and a second side defining a retainer interior for removably receiving the food baskets, with each of the retainers further including a generally open end for the slidable receipt of the food baskets into the retainer interior, with the top, bottom, and sides of the retainer being generally closed for removal of the food baskets therethrough but which allow the food in the food receiving interior of the food baskets to be exposed to the heating means; and means for conveying the retainers and the food baskets located therein along a cooking cycle path.

16. The food cooking machine of claim 15 wherein the bottom, sides, and top of the food baskets are generally closed for preventing the food from passing therethrough; and wherein the food basksets further include means for providing access to the food receiving interior of the food baskets comprising, in combination: means for hinging at least the top of the food basket to one of the sides of the food basket from an open position to a closed position and wherein the interior of the retainers have a size complementary to the size of the food baskets to prevent the top of the food basket from hinging from its closed position when the food basket is received within the retainer; and wherein the retainers are formed of metal rods.

17. Food cooking machine comprising, in combination: means for heating the food; and means for transporting the food along a cooking cycle path to expose the food to the heating means; wherein the cooking cycle path of the transporting means is generally in a first, horizontal direction over the heating means, in a second, horizontal direction 180° from the first, horizontal direction over the heating means, in a third, vertically downward direction beyond the heating means and 90° from the second direction, in a fourth, vertically upward direction 180° from the third direction, and back to the first direction for exposing both sides of the food to the heating means when the food is in horizontal directions of the cooking cycle path, for allowing fat to drain off the food in vertical directions of the cooking cycle path, and for increasing the capacity of the transporting means.

18. The food cooking machine of claim 17 wherein the cooking cycle path of the transporting means from the second direction to the third direction is generally in a fifth direction 45° from the second direction and in a sixth direction 45° from the third direction for further increasing the capacity of the transporting means.

19. The food cooking machine of claim 17 further comprising, in combination: a multiplicity of food baskets, with each food basket having a bottom, a first side, a second side, a third side, a fourth side, and a top defining a food receiving interior, with the food baskets formed of material allowing exposure to the heating means of the food located within the food receiving interior of the food baskets; with the transporting means comprising, in combination: retainers for removably receiving the food baskets, with each of the retainers including a top, a bottom, a first side, and a second side defining a retainer interior for removably receiving the food baskets, with each of the retainers further including a generally open end for the slidable receipt of the food baskets into the retainer interior, with the top, bottom, and sides of the retainer being generally closed for removal of the food baskets therethrough but which allow the food in the food receiving interior of the food baskets to be exposed to the heating means; and means for conveying the retainers and the food baskets located therein along the cooking cycle path.

20. The food cooking machine of claim 17 further comprising, in combination: means for dispensing sauce to the food; wherein the transporting means comprises means for transporting the food to expose the food to the heating means and to expose the food to the sauce dispensing means; with the sauce dispensing means comprising, in combination: a sauce dispenser; means for pivotally mounting the sauce dispenser about a pivot axis for movement between an on position wherein the sauce of the sauce dispenser is dispensed to the food and an off position wherein the sauce is retained within the sauce dispenser; actuating tabs formed on the transporting means for engaging with the sauce dispenser and for pivoting the sauce dispenser from its off position to its on position, with the pivot axis of the sauce dispenser being positioned so that the sauce dispenser remains in its off position unless the sauce dispenser is engaged by the actuating tabs of the transporting means.

* * * * *

UNITED STATES PATENT OFFICE
CERTIFICATE OF CORRECTION

Patent No. 4,548,130            Dated October 22, 1985

Inventor(s) Lester Diener and Ernest J. Miller

It is certified that error appears in the above-identified patent and that said Letters Patent are hereby corrected as shown below:

Column 2, line 28, cancel "jacket" and substitute therefor --jack--.

Column 5, line 52, cancel "4" and substitute therefor --5--.

Signed and Sealed this

Seventh Day of January 1986

[SEAL]

Attest:

Attesting Officer

DONALD J. QUIGG

Commissioner of Patents and Trademarks